United States Patent
Futamura et al.

(10) Patent No.: US 7,808,916 B1
(45) Date of Patent: Oct. 5, 2010

(54) ANOMALY DETECTION SYSTEMS FOR A COMPUTER NETWORK

(75) Inventors: Kenichi Futamura, Middletown, NJ (US); Danielle Liu, Morganville, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 965 days.

(21) Appl. No.: 11/275,356

(22) Filed: Dec. 28, 2005

(51) Int. Cl.
*H04J 1/16* (2006.01)

(52) U.S. Cl. ........................ 370/242; 370/241

(58) Field of Classification Search ............... 370/229, 370/230, 230.1, 241, 242, 243, 244, 245, 370/246, 247, 252; 709/220, 223, 225
See application file for complete search history.

(56) References Cited

U.S. PATENT DOCUMENTS

| | | | |
|---|---|---|---|
| 5,150,318 | A | 9/1992 | Kontani et al. |
| 5,195,049 | A | 3/1993 | Kontani et al. |
| 5,331,642 | A * | 7/1994 | Valley et al. ............... 714/705 |
| 5,359,649 | A * | 10/1994 | Rosu et al. ............ 379/221.07 |
| 6,038,388 | A | 3/2000 | Hogden et al. |
| 6,091,846 | A | 7/2000 | Lin et al. |
| 6,267,013 | B1 | 7/2001 | Stark et al. |
| 6,439,062 | B2 | 8/2002 | Stark et al. |
| 6,483,938 | B1 | 11/2002 | Hennessey et al. |
| 6,735,703 | B1 | 5/2004 | Kilpatrick et al. |
| 6,742,124 | B1 | 5/2004 | Kilpatrick et al. |
| 6,889,218 | B1 | 5/2005 | Nassehi |
| 7,072,305 | B1 * | 7/2006 | Gregson ..................... 370/241 |
| 2002/0194119 | A1 * | 12/2002 | Wright et al. ................. 705/38 |
| 2002/0198759 | A1 * | 12/2002 | Gilday et al. ................. 705/10 |
| 2003/0086422 | A1 | 5/2003 | Klinker et al. |
| 2004/0215976 | A1 * | 10/2004 | Jain .......................... 713/201 |
| 2005/0169185 | A1 * | 8/2005 | Qiu et al. .................... 370/241 |
| 2005/0169186 | A1 * | 8/2005 | Qiu et al. .................... 370/242 |
| 2005/0209823 | A1 * | 9/2005 | Nguyen et al. ............. 702/185 |
| 2006/0176824 | A1 * | 8/2006 | Laver et al. ................. 370/241 |
| 2007/0140128 | A1 * | 6/2007 | Klinker et al. ............. 370/238 |
| 2007/0150949 | A1 | 6/2007 | Futamura et al. |
| 2007/0268182 | A1 * | 11/2007 | Bourdelais et al. .......... 342/452 |
| 2008/0249742 | A1 * | 10/2008 | Scott et al. ................. 702/179 |

OTHER PUBLICATIONS

Debin Gao, et al., "On Gray-Box Program Tracking for Anomaly Detection," 16 pages.

Sarah Sorenson, "Competitive Overview of Statistical Anomaly Detection," Juniper Networks, Inc., 2004, pp. 1-7.

(Continued)

*Primary Examiner*—Aung S Moe
*Assistant Examiner*—Abdullah Riyami
(74) *Attorney, Agent, or Firm*—Hope Baldauff Hartman LLC

(57) ABSTRACT

Methodologies and systems for detecting an anomaly in a flow of data or data stream are described herein. To detect an anomaly, an anomaly detection server may create a baseline based on historical or other known non-anomalous data within the data stream. The anomaly detection server then generates one or more test values based on current data in the data stream, and compares the test value(s) to the baseline to determine whether they vary by more than a predetermined amount. If the deviation exceeds the predetermined amount, an alarm is triggered. The anomaly detection server may continually adjust the baseline based on the current data in the data stream, and may renormalize the baseline periodically if desired or necessary.

6 Claims, 4 Drawing Sheets

OTHER PUBLICATIONS

Lubomir Nistor, "Rules definition for anomaly based intrusion detection," v1.1, 2002-2003, pp. 1-9.

Matthew V. Mahoney, et al., "PHAD: Packet Header Anomaly Detection for Identifying Hostile Network Traffic," Florida Institute of Technology Technical Report CS-2001-04, pp. 1-17.

"What is anomaly detection?," printed from http://www.imperva.com/application_defense_center/glossary/anomaly, printed on Oct. 27, 2005, 1 page.

"Anomaly detection with cfenvd and cfenvgraph," printed from http://www.cfengine.org/docs/cfengine-Anomalies.html, on Oct. 27, 2005, pp. 1-15.

Christopher Kruegel, et al., "Anomaly Detection of Web-based Attacks," CCS'03, Oct. 27-31, 2005, 11 pages.

Henry Hamping Feng, et al., "Anomaly Detecting Using Call Stack Information," University of Massachusetts and Georgia Institute of Technology, 14 pages.

Gaia Maselli, et al., "Design and Implementation of an Anomaly Detection System: an Empirical Approach," pp. 1-20.

"Esphion: Anomaly Detection 101," printed from http://esphion.blogs.com/esphion/2005/10/anomaly_detecti.html, on Oct. 27, 2005, pp. 1-5.

Dragos Margineantu, et al., "International Work Shop on Data Mining Methods for Anomaly Detection," Aug. 21, 2005, 87 pages.

U.S. Official Action dated Mar. 25, 2009 in U.S. Appl. No. 11/275,351.

* cited by examiner $E1: \mu_N = X$
$E2: S_1 = S_2 = ... = S_N = 1$
$E3: Var_N = MinSD^2$
$N$ = # of intervals per cycle, MinSD > 0 (minimum SD), X = first data point

FIG. 3

$E4: \mu_i = \min(\alpha\theta\frac{X_i}{S_{i-N}} + (1-\alpha\theta)\mu_{i-1}, \mu_{i-1} + \lambda\theta\sqrt{Var_{i-1}})$
$E5: S_i = \max(\min(\beta\theta\frac{X_i}{\mu_{i-1}} + (1-\beta\theta)S_{i-N}, (1+\rho\theta)S_{i-N}), (1-\rho\theta)S_{i-N})$
$E6: Var_i = \max(\min(\gamma\theta S_{i-N}(\frac{X_i}{S_{i-N}} - \mu_{i-1})^2 + (1-\gamma\theta)Var_{i-1}, (1+\psi\theta)^2 Var_{i-1}), MinSD^2)$
$i$ = interval, $N$ = # of intervals in cycle, $\theta$ = ramp up rate $\geq 1$
$0 < \alpha, \beta, \gamma, \lambda, \rho, \psi < \frac{1}{\theta}$ (noise smoothing parameters), MinSD > 0 (minimum SD)

FIG. 4

$E7: \mu_i = \min(\alpha\frac{X_i}{S_{i-N}} + (1-\alpha)\mu_{i-1}, \mu_{i-1} + \lambda\sqrt{Var_{i-1}})$
$E8: S_i = \max(\min(\beta\frac{X_i}{\mu_{i-1}} + (1-\beta)S_{i-N}, (1+\rho)S_{i-N}), (1-\rho)S_{i-N})$
$E9: Var_i = \max(\min(\gamma S_{i-N}(\frac{X_i}{S_{i-N}} - \mu_{i-1})^2 + (1-\gamma)Var_{i-1}, (1+\psi)^2 Var_{i-1}), MinSD^2)$
$E10: D_i = \frac{X_i - S_{i-N}\mu_{i-1}}{\sqrt{S_{i-N}Var_{i-1}}}$
$E11: Z_i = [Z_{i-1} + f(D_i) - \delta]^+$
Generate alarm if $Z_i > T$ and $D_i > T$.
$i$ = interval, $N$ = # of intervals in cycle,
$0 < \alpha, \beta, \gamma, \lambda, \rho, \psi < 1$ (noise smoothing parameters), MinSD > 0 (minimum SD)
$\delta$ = growth/stabilization correction, $T$ = alarm threshold

FIG. 5

$E12: \mu_i = \alpha X_i + (1-\alpha)\mu_{i-1}$

FIG. 6

$E13: \mu_i = \alpha\frac{X_i}{S_{i-N}} + (1-\alpha)\mu_{i-1}$

FIG. 7

$$E14: S_i = \beta \frac{X_i}{\mu_{i-1}} + (1-\beta)S_{i-N}$$

FIG. 8

$$E15: Var_i = \gamma S_{i-N}(\frac{X_i}{S_{i-N}} - \mu_{i-1})^2 + (1-\gamma)Var_{i-1}$$

FIG. 9

$$E16: \mu_i \leq \mu_{i-1} + \lambda\sqrt{Var_{i-1}}$$

FIG. 10

$$E17: \mu_i = \min(\text{New estimate of } \mu, \mu_{i-1} + \lambda\sqrt{Var_{i-1}})$$

FIG. 11

$$E18: (1-\rho)S_{i-N} \leq S_i \leq (1+\rho)S_{i-N}$$

FIG. 12

$$E19: S_i = \max(\min(\text{New estimate of } S_i, (1+\rho)S_{i-N}), (1-\rho)S_{i-N})$$

FIG. 13

$$E20: MinSD^2 \leq Var_i \leq (1+\psi)^2 Var_{i-1}$$

FIG. 14

$$E21: Var_i = \max(\min(\text{New estimate of } Var_i, (1+\psi)^2 Var_{i-1}), MinSD^2)$$

FIG. 15

$$E22: \mu_N = \frac{\sum_{c=1}^{M}\sum_{i=1}^{N} X_{i,c}}{MN}$$

$$E23: S_i = \max\left(\frac{\sum_{c=1}^{M} X_{i,c}}{\mu_1}, MinS\right), \quad i = 1,\ldots,N$$

$$E24: Var_N = \max\left(\frac{\sum_{c=1}^{M}\sum_{i=1}^{N}(\frac{X_{i,c}}{S_i} - \mu_1)^2}{MN-1}, MinSD^2\right)$$

$N = \#$ of intervals per cycle, $M = \#$ of cycles
$MinS > 0$ (min Seasonality factor), $MinSD > 0$ (minimum SD)

FIG. 16

$$E25: S = \frac{\sum_{j=i-N+1}^{i} S_j}{N}$$

$$E26: \text{New } S_j = \frac{S_j}{S}, \quad j = i - N + 1,\ldots,i$$

$$E27: \text{New } \mu_i = S\mu_i$$

$$E28: \text{New } Var_i = \max(SVar_i, MinSD^2)$$

FIG. 17

$$E29: S_i = \begin{cases} S_{i-N} & \text{if } X_i = 0 \\ (1+\rho)S_{i-N} & \text{if } X_i > 0 \end{cases}$$

FIG. 18

ANOMALY DETECTION SYSTEMS FOR A COMPUTER NETWORK

FIELD OF THE INVENTION

The invention relates generally to computer networking. More specifically, the invention provides methods and systems for detecting anomalies in computer networks, such as malicious or erroneous network traffic causing an interruption to a computer network or network service.

BACKGROUND OF THE INVENTION

Computer networks are vulnerable to many types of malicious attacks, such as viruses, worms, denial of service (DoS) attacks, distributed denial of service (DDoS) attacks, and the like. A network administrator often must take remedial action when an attack is detected, preferably as quickly as possible. However, differentiating what is normal network activity or noise from a possible network attack, anomaly, or problem is a difficult and imprecise task. An increase in network activity might be normal behavior or it might be a malicious act, such as the propagation of a worm. In addition, it is even more difficult to detect anomalies in the face of cyclical (seasonal) data, missing data, highly variable data (or where variability changes with the average), and changes in the baseline or what is considered "normal." It would thus be an advance in the art to provide a more efficient and effective tool to determine the difference between normal and harmful network traffic activities.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, aspects of the present invention are directed to detecting abnormal activity in a stream of positive, time-based data. One or more features build a baseline metric based on patterns in historical data and compare new network traffic data to the baseline metric to determine if the new network traffic data is anomalous.

Various aspects of the invention provide methods, systems, and computer readable media for detecting anomalous traffic in a data stream, by generating a baseline value corresponding to non-anomalous data in the data stream, generating a first test value based on current data of the data stream, adjusting the baseline value based on the first test value, and triggering an anomaly alarm when the first test value varies from the baseline by at least a predetermined value.

Other optional aspects of the invention may provide for using a ramp-up value to generate the baseline value, using exponential smoothing to generate the baseline value, and/or using exponential smoothing to adjust the baseline value.

According to various embodiments, the non-anomalous data and current data may represent numbers of packets sent over a network or the amounts of bytes sent over a network. In other embodiment, the data may represent other values, as further described below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 3 illustrates one or more equations that may be used to detect an anomaly according to an illustrative aspect of the invention.

FIG. 4 illustrates one or more equations that may be used to detect an anomaly according to an illustrative aspect of the invention.

FIG. 5 illustrates one or more equations that may be used to detect an anomaly according to an illustrative aspect of the invention.

FIG. 6 illustrates one or more equations that may be used to detect an anomaly according to an illustrative aspect of the invention.

FIG. 7 illustrates one or more equations that may be used to detect an anomaly according to an illustrative aspect of the invention.

FIG. 8 illustrates one or more equations that may be used to detect an anomaly according to an illustrative aspect of the invention.

FIG. 9 illustrates one or more equations that may be used to detect an anomaly according to an illustrative aspect of the invention.

FIG. 10 illustrates one or more equations that may be used to detect an anomaly according to an illustrative aspect of the invention.

FIG. 11 illustrates one or more equations that may be used to detect an anomaly according to an illustrative aspect of the invention.

FIG. 12 illustrates one or more equations that may be used to detect an anomaly according to an illustrative aspect of the invention.

FIG. 13 illustrates one or more equations that may be used to detect an anomaly according to an illustrative aspect of the invention.

FIG. 14 illustrates one or more equations that may be used to detect an anomaly according to an illustrative aspect of the invention.

FIG. 15 illustrates one or more equations that may be used to detect an anomaly according to an illustrative aspect of the invention.

FIG. 16 illustrates one or more equations that may be used to detect an anomaly according to an illustrative aspect of the invention.

FIG. 17 illustrates one or more equations that may be used to detect an anomaly according to an illustrative aspect of the invention.

FIG. 18 illustrates one or more equations that may be used to detect an anomaly according to an illustrative aspect of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

One or more aspects of the invention may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Various features of the invention combine aspects of forecasting and control theory to detect anomalous behavior of network traffic. Aspects may also be used for data security and intrusion detection, credit card fraud detection, quality monitoring, as well as other areas such as stock market fluctuations, healthcare (e.g., patient condition monitoring), and weather fluctuations. An anomaly, as used herein, refers to any change in a characteristic indicative of malicious, harmful, improper, illegal, or otherwise suspicious activity. In a computer network, e.g., an anomaly might include a substantial increase in network traffic, which can be indicative of DoS or DDoS attacks, propagation of a worm, viruses, or the like. In a credit card system, e.g., an anomaly might include unusual spending occurring against a customer's credit card, which can be indicative of credit card fraud resulting from stolen or misappropriated credit card data.

Figure 1:
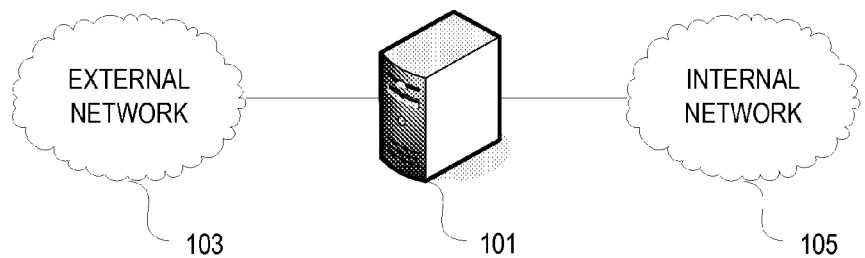
FIG. 1 illustrates a system architecture that may be used according to an illustrative aspect of the invention.

With reference to FIG. 1, an anomaly detection server (ADS) 101 may be placed within or between one or more networks 103 and 105. For example, ADS 101 may be placed between external network 103, such as the Internet or other public network, and internal network 105, such as a corporate LAN or other private network. ADS 101 may be configured with software or hardware instructions to operate as according to one or more aspects described herein. One or more processors within ADS 101 execute the software instructions stored in memory or hardware instructions stored on an integrated circuit, such as an application specific integrated circuit (ASIC). FIG. 1 illustrates but one possible example, and ADS 101 may be placed at any desired location within or between networks, e.g., at gateways, access points, firewalls, and the like.

Figure 2:
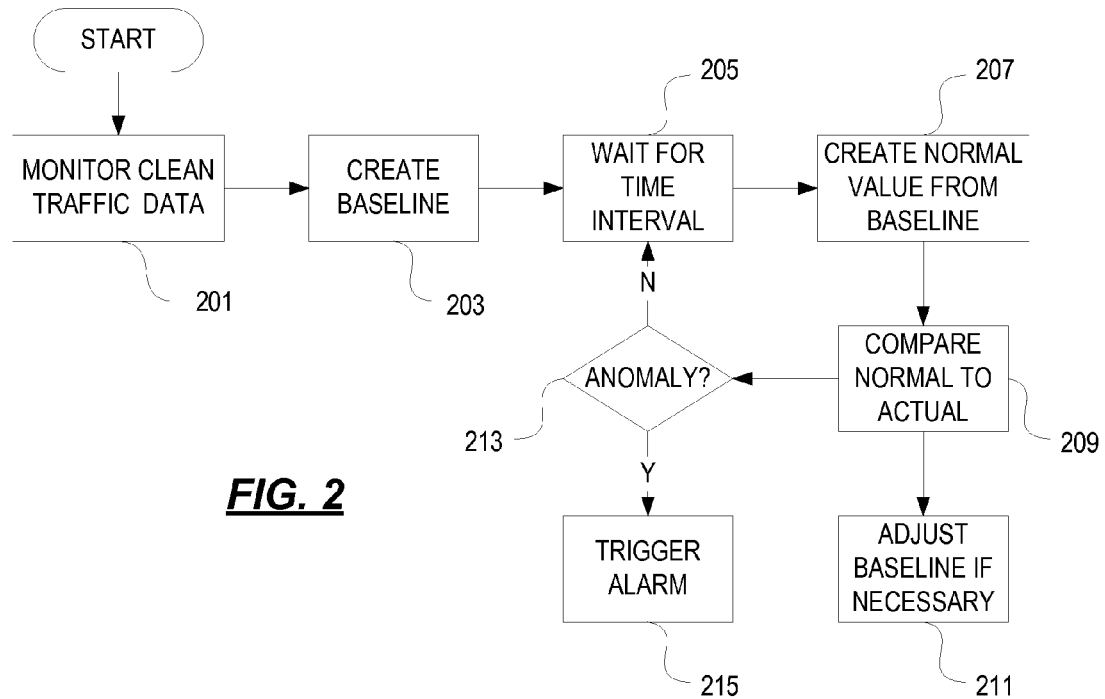
FIG. 2 illustrates a flowchart for a method of detecting an anomaly according to an illustrative aspect of the invention.

FIG. 2 illustrates a general method performed by ADS 101 to detect anomalous network traffic. Initially, in step 201, ADS 101 creates a baseline by monitoring clean (non-negative) network traffic data on the data stream to be monitored, e.g., historical data or other data known not to include anomalous traffic. ADS 101 may monitor and analyze packet volume for particular ports on the network, counts of infectious hosts in a propagating worm, entropy of the distribution of IP space accessed by a particular customer, etc. So for example, the ADS 101 may monitor traffic volume (e.g., flows, packets, bytes) to and from each port (0-65536) for TCP and UDP protocols.

In step 203, the ADS 101 uses the data gathered in step 201 to create an initial baseline value against which network traffic is to be compared. The ADS 101 may create a baseline of the normal level, variability, and cyclical patterns based on the historical data, using various statistical techniques, such as initialization equations E1, E2, and E3 illustrated in FIG. 3. ADS 101 may then use equations E4, E5, and E6 of FIG. 4 for each historical interval i (starting with N+1). After initialization is complete, ADS 101 may perform traffic analysis at regular or irregular intervals i, continuously, or according to some other metric, and in step 205 waits for an indication, based on whatever metric is in use, to perform a traffic analysis on the data stream.

In step 207, ADS 101 creates a normal value for the data stream based on the baseline data, e.g., estimating the normal value using equations E7, E8, and E9 in FIG. 5. In step 209 the ADS 101 then compares the normal value to the current actual value for the same data of the data stream, e.g., using equations E10 and E11 in FIG. 5. ADS 101 may update the baseline parameters based on the current actual values in step 211, and simultaneously (or synchronously) determines in step 213 whether to trigger an alarm based on the analysis of the current actual data stream analysis. For example, in step 213 the ADS 101 may trigger an alarm when $Z_i > T$ and $D_i > T$, based on the evaluation of equations E10 and E11 in step 209. If an anomaly is detected, the ADS 101 in step 215 triggers an alarm, e.g., by sending a notification to appropriate personnel, taking remedial action (e.g., automatically blocking traffic from a particular sender), or performing some other operation specified to be performed when an alarm is triggered, and optionally based on the type of alarm.

Equations E7 through E11 in FIG. 5 allow the ADS 101 to determine whether the deviation of the actual value to the normal value is anomalous by itself, or in conjunction with recent historical values, normalizing for variability, level, and seasonality. The ADS 101 may then determine the significance of the set of anomalies, and trigger an alarm as appropriate, with significance levels, to alert users of anomalous levels of traffic in the monitored data stream.

Thus, values of equations E1-E11 may be adjusted according to the type of data being monitored. In one example, for volumetric traffic analysis of the number of bytes to specific network ports, the following values may be used: N=168 hours; $\alpha=\gamma=\lambda=0.00198$; $\beta=\rho=0.167$; $\psi=0.0119$; $\theta=3.0$; $\delta=1.0$; T=10.0; and f(x)=cube root of x.

While equations E1-E11 as illustrated in FIGS. 3-5 are believed to be self-enabling, equations E1-E11 will now be explained in more detail for illustrative purposes. In equations E1-E11, $\mu_i$ represents the estimate of the overall mean at time interval i (after observing interval i). Stated another way, given data points $X_1, X_2, \ldots, X_i$, $\mu_i$ is an estimate for the overall mean. Each data point $X_i$ represents the value being monitored at that interval i, e.g., data flow at interval i, packets at interval i, bytes at interval i, etc.

$S_i$ represents the estimate of any optional seasonality factor for time interval i, that is, the mean of a particular interval in relation to the overall mean. For example, if the daily mean traffic volume is 50 GB/hour, but the mean traffic volume at 2:00 pm is 75 GB/hour, the seasonality factor $S_{2:00\ pm}=75/50=1.5$ (assuming a daily cycle).

$Var_i$ represents the estimate of the overall normalized variance at time interval i. Stated another way, $Var_i$ is the variance if there were no seasonality effects. The variance may be assumed to be proportional to the mean, such that there is an expectation that the variance may be larger if the mean is higher. Therefore, an estimate of the variance for a given time interval is $S_i Var_i$.

In terms of storage for calculation of future parameter values, only the latest value of $\mu_i$, the last N (where N=the number of intervals in a cycle) values of $S_i$, and the latest value of $Var_i$ need to be stored. All future estimates can be calculated from these (and $X_i$).

According to an aspect of the invention, the mean, seasonality factors, and variance may be updated using exponential smoothing, a form of weighted averaging. In an illustrative embodiment, exponential smoothing may be performed using an equation such as E12, illustrates in FIG. 6, where $\mu_{i-1}$ represents the previous estimate, $X_i$ represents the best estimate given only the most recent point. E12 thus calculates a weighted average of these two estimates, where α=amount of weight put on the most recent interval.

An estimate for $X_i$ before interval i is $S_{i-N}\mu_{i-1}$, which represents "the estimate for seasonality effect for the current interval" times "the estimate of the overall mean". Therefore, an estimate of the mean given only the most recent point would be $$\frac{X_i}{S_{i-N}}$$

(i.e., removing the seasonality effect). Applying exponential smoothing to the estimate of the mean results in equation E13, illustrated in FIG. 7. Similarly, an estimate of the seasonality factor for the current interval in a cycle might be $$\frac{X_i}{\mu_{i-1}}.$$

Because the previous estimate for the seasonality factor for this interval is $S_{i-N}$ (e.g., the seasonality factor for the interval 2 pm on the previous day), applying exponential smoothing results in equation E14 illustrated in FIG. 8, where β represents a weighting factor. An estimate of the normalized variance given a single point $X_i$ may be calculated using $$S_{i-N}\left(\frac{X_i}{S_{i-N}} - \mu_{i-1}\right)^2.$$

Applying exponential smoothing results in equation E15 illustrated in FIG. 9.

Due to potential outliers in the data, constraints may be placed on the amount of change allowed in each variable. For example, the new estimate of the overall mean might be limited to increase not more than λ standard deviations over the previous estimate. Stated another way, equations E16 and/or E17 illustrated in FIG. 10 and FIG. 11, respectively, may be used to limit estimates of the overall mean. Similarly, the estimate of the seasonality factor preferably lies between 1−ρ and 1+ρ of the previous estimate. Stated another way, equations E18 and/or E19 illustrated in FIG. 12 and FIG. 13, respectively, may be used to limit estimates of the seasonality factor. The new estimate of the variance might be limited to not increase greater than $(1+\psi)^2$ of the old estimate, while remaining larger than $MinSD^2$ (minimum standard deviation squared). Stated another way, equations E20 and/or E21, illustrated in FIG. 14 and FIG. 15, respectively, may be used to limit the estimates of the variance.

Smoothing parameters may be used during the initialization phase (steps 201-203), as well as during other phases. These smoothing parameters are limited by $\alpha,\beta,\gamma,\lambda,\rho,\psi > 0$, and $\alpha, \beta, \gamma, \rho < 1$ (λ and ψ may be greater than 1, but preferably λ and ψ remain small). The parameters α, β, γ represent the impact of the most recent interval on the estimate calculation. If the ADS 101 or its users are unsure of the estimates, smoothing parameters are preferably set higher to put more emphasis on recently observed data. On the other hand, smoothing parameters should be lower if the baseline estimates are fairly stable. Similarly, λ,ρ,ψ represent the amount by which the estimates can change, so these parameters are preferably higher when calculating a new baseline, and lower when the baseline is stable.

During the initialization phase, when no estimates are provided, $\alpha,\beta,\gamma,\lambda,\rho,\psi$ may be higher than during the normal phase (steps 205-215). A ramp-up factor θ may be applied to each of the smoothing parameters to speed up convergence. The ramp-up factor may be established such that θ>1. Stated another way, during initialization, the following substitutions may be used: αθ for α, βθ for β, etc.

When there is no previous data (e.g., during the initialization phase), the initial estimates of the baseline variables may be assigned as illustrated in FIG. 3. Using the above information, the initialization phase proceeds using equations E4, E5, E6 as illustrated in FIG. 4. If manual analysis of several cycles of data is feasible, the initial values may be calculated more accurately, in order to speed up the ramp-up time. In this case, initial estimates may be calculated using equations E22, E23, E24 illustrated in FIG. 16, where $S_i > 0$ (i.e., setting a MinS>0). The baseline calculations for actual data during iterations of i may be calculated using equations E7, E8, and E9 as illustrated in FIG. 5.

The determination of whether to trigger an alarm or not may be made using equations E10 and E11 illustrated in FIG. 5. $D_i$ represents a measure of the deviation of $X_i$ from the estimated baseline. This value may be normalized for mean, seasonality, and variance. Before observing $X_i$, $S_{i-N}\mu_{i-1}$ is the baseline estimate, and $S_{i-N}Var_{i-1}$ is the variance estimate, so equation E10 is a measure of the number of standard deviations that $X_i$ is from the estimate.

$Z_i$ represents a cumulative sum of deviations. This cumulative sum measures, over a period of time, to what degree actual values have deviated from the estimated baseline. The case $$f(x) = x, \quad D_i = X_i - \mu_i \quad \text{or} \quad D_i = \frac{X_i - \mu_i}{\sigma}$$

(with fixed thresholds) is a CuSum statistics generally used in Control Theory and is used to determine if a process is out of control. The CuSum value $Z_i$ in this case is reset (e.g., manually) to indicate that the process has returned to normal conditions.

δ accounts for normal growth and stabilizes the cumulative sum calculation. If some growth is expected in the data stream (perhaps normal increase in network traffic over time), this parameter is preferably increased accordingly. Furthermore, the δ parameter is preferably set to a value between a "normal" state and an anomalous state. For example, in traditional CuSum Control Theory, δ is often set to $$\frac{K}{2}$$

where K represents an "out of control" level. A larger value for δ puts more emphasis on detecting short intense anomalies (large spikes) rather than prolonged, yet smaller, increases in level. A large δ also effectively increases the threshold (T) level.

T is the threshold for an alarm to be generated. Larger T results in fewer alarms. Multiple levels of alarms are often used to indicate the severity of the anomaly. For example, as a starting approximation, the formula $T_L=TC^{L-1}$ (C>1) may be used to represent the threshold for a level L alarm. In one embodiment level 1 is defined to be the lowest level alarm.

Missing data generally does not pose problems for the methods described herein. The "old" values may be used (i.e., $\mu_i=\mu_{i-1}$, $S_i=S_{i-N}$, $Var_i=Var_{i-1}$, $D_i=D_{i-1}$, $Z_i=Z_{i-1}$) in their respective places. When missing data are replaced by old values, alarms optionally may be temporarily inhibited (except perhaps to indicate that data was missing).

For numerical stability, the baseline variables may be renormalized periodically (at time i) using equations E25, E26, E27, and E28 illustrated in FIG. 17. Renormalization may be triggered, e.g., by the presence of more than a predetermined number of zero values in the data. Furthermore, in the unlikely case that $\mu_{i-1}=0$ (e.g., when all historical values are zero), ADS 101 may use equation E29 illustrated in FIG. 18 in place of the $S_i$ calculation.

As discussed above, during implementation, in order to conserve memory and data processing resources, it is not necessary to store all historical values of the variables. Only the latest mean estimate, the last N estimates of seasonality, and the latest estimate of variance need to be stored in order to continue processing detection of anomalies a described herein. In addition, ADS 101 may store the latest CuSum statistic for alarming. Stated another way, according to one embodiment, the ADS 101 stores the values $\mu$, $S_i$(i=1, ..., N), Var, and Z from one period to the next.

A restatement of the equations illustrated in the Figures thus follows. During initialization (steps 201-203), the initial data may be calculated as:

$\mu=X_1$ $S_1=S_2=\ldots=S_N=1$ $Var=MinSD^2$

N=# of intervals per cycle, MinSD>0 (minimum SD)

And for each sequential (historical) data point, X:

$$\text{New } \mu = \min\left(\alpha\theta\frac{X}{S_i} + (1-\alpha\theta)\mu, \mu + \lambda\theta\sqrt{Var}\right)$$

$$\text{New } S_i = \max\left(\min\left(\beta\theta\frac{X}{\mu} + (1-\beta\theta)S_i, (1+\rho\theta)S_i\right), (1-\rho\theta)S_i\right)$$

New $Var =$ $$\max\left(\min\left(\gamma\theta S_i\left(\frac{X}{S_i}-\mu\right)^2 + (1-\gamma\theta)Var, (1+\psi\theta)^2 Var\right), MinSD^2\right)$$

$\mu$=New $\mu$, $S_i$=New $S_i$, Var=New Var $i$=interval of cycle, $$0 < \alpha, \beta, \gamma, \lambda, \rho, \psi < \frac{1}{\theta} \text{(noise smoothing parameters)},$$

$$MinSD > 0 \text{(minimum SD)}$$

Alternatively, if sufficient historical data (M cycles) is available and manual analysis is feasible, the values may be calculated as follows:

$$\mu = \frac{\sum_{c=1}^{M}\sum_{i=1}^{N} X_{i,c}}{MN}$$

$$S_i = \max\left(\frac{\sum_{c=1}^{M} X_{i,c}}{\mu_1}, MinS\right), i=1,\ldots,N$$

$$Var = \max\left(\frac{\sum_{c=1}^{M}\sum_{i=1}^{N}\left(\frac{X_{i,c}}{S_i}-\mu\right)^2}{MN-1}, MinSD^2\right)$$

N=# of intervals per cycle, M=# of cycles,

MinS>0 (min Seasonality factor), MinSD>0 (minimum SD)

During the analysis phase (steps 205-215), while there is a stable baseline, for each (current) data point X:

$$\text{New } \mu = \min\left(\alpha\frac{X}{S_i} + (1-\alpha)\mu, \mu + \lambda\sqrt{Var}\right)$$

$$\text{New } S_i = \max\left(\min\left(\beta\frac{X}{\mu} + (1-\beta)S_i, (1+\rho)S_i\right), (1-\rho)S_i\right)$$

New $Var =$ $$\max\left(\min\left(\gamma S_i\left(\frac{X}{S_i}-\mu\right)^2 + (1-\gamma)Var, (1+\psi)^2 Var\right), MinSD^2\right)$$

$\mu$=New $\mu$, $S_i$=New $S_i$, Var=New Var $$D = \frac{X - S_i\mu}{\sqrt{S_i Var}}$$

$Z=[Z+f(D)-\delta]^+$

Generate alarm if $Z>T$ and $D>T$.

$i$=interval of cycle, $0<\alpha,\beta,\gamma,\lambda,\rho,\psi<1$ (noise smoothing parameters), MINSD>0 (minimum SD)

δ=growth/stabilization correction, T=alarm threshold

And periodically, for numerical stability:

$$S = \frac{\sum_{i=1}^{N} S_i}{N}$$

-continued $$S_i = \frac{S_i}{S}, i = 1, \ldots, N$$

$$\mu = S\mu$$

$$Var = \max(SVar, MinSD^2)$$

For missing data points, according to an aspect of the invention no calculation might be done (i.e., the variables do not change). In the (unlikely) case that µ=0 (e.g., when all historical values are zero), the following equation may be used in place of the $S_i$ calculation:

$$\text{New } S_i = \begin{cases} S_i & \text{if } X_i \\ (1+\rho)S_i & \text{if } X_i > 0 \end{cases} \text{ (only if } \mu = 0\text{).}$$

For the analysis of volumetric traffic by port number of a specific network, the following data values were used:

$N$=168 hours $\alpha=\gamma=\lambda=0.00198$, $\beta=\rho=0.167$, $\psi=0.0119$, MinSD=100

$\delta=1.0$, $T=100.0$, $C=3.0$ (for multi-level alarms)

$f(x)=\sqrt[3]{x}$

In this monitored network, the amount of traffic to or from any port ranged from less than 100 MB to over 3 TB an hour. Because the number of data streams monitored was large (65,536 ports×2 protocols (UDP/TCP)×2 directions (to/from)×3 data types (flows, number of packets, bytes)=786,432 total) the parameters (and f(x)) used are considered conservative in order to reduce the number of total alarms during testing. Other values may be used, and various alarm levels may be set, to establish an appropriate number for the specific network and traffic being monitored.

Various aspects and/or features of the methodologies and systems described herein may be used to monitor network traffic data for anomalous conditions. Various aspects provide for anomaly monitoring using a baseline parameter in conjunction with anomaly detection and alarming. One or more aspects also provide for simultaneously adjusting the baseline while using the baseline to detect an anomaly. Another aspect discussed above allows exponential smoothing to calculate the mean, slope, seasonality, and variance, among other values, and then use the smoothed values to trigger an anomaly alarm.

As indicated above, the methodologies described herein are applicable to any problem in which one must detect abnormal activity over time. Therefore, any business that needs to detect abnormal behavior will benefit from the various aspects described herein, including areas such as network security, credit management, quality control, meteorology, medicine, or the stock market, to name but a few. The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A network server, comprising:
a processor;
memory storing executable instructions that, when executed by the processor, perform a method for detecting anomalous traffic in a data stream, said method comprising steps of:
 a) generating a baseline value corresponding to non-anomalous data in the data stream;
 b) generating a first test value based on current data of the data stream;
 c) adjusting the baseline value based on the first test value; and
 d) triggering an anomaly alarm when the first test value varies from the baseline by at least a predetermined value,
wherein step a) comprises steps of:
 i) initializing parameters using the formulas:

$$\mu_1 = X_1$$

$$S_1 = S_2 = \ldots = S_N = 1$$

$$Var_1 = MinSD^2$$

where N represents a number of intervals per cycle, MinSD>0, and X represents a data point, and
 ii) generating the baseline by evaluating the formulas:

$$S_i =$$
$$\mu_i = \min\left(\alpha\theta\frac{X_i}{S_{i-N}} + (1-\alpha\theta)\mu_{i-1}, \mu_{i-1} + \lambda\theta\sqrt{Var_{i-1}}\right)$$

$$\max\left(\min\left(\beta\theta\frac{X_i}{\mu_{i-1}} + (1-\beta\theta)S_{i-N}, (1+\rho\theta)S_{i-N}\right), (1-\rho\theta)S_{i-N}\right)$$

$$Var_i = \max\left(\min\left(\gamma\theta S_{i-N}\left(\frac{X_i}{S_{i-N}} - \mu_i\right)^2 + (1-\gamma\theta)Var_{i-1}, (1+\psi\theta)^2 Var_{i-1}\right), MinSD^2\right)$$

where i represents an interval, θ represents a ramp-up value>=1, α,β,γ,λ,ρ,ψ represent smoothing parameters between zero and 1/θ;
wherein one or more of steps b) and c) comprises evaluating the formulas:

$$\mu_i = \min\left(\alpha\frac{X_i}{S_{i-N}} + (1-\alpha)\mu_{i-1}, \mu_{i-1} + \lambda\sqrt{Var_{i-1}}\right)$$

$$S_i = \max\left(\min\left(\beta\frac{X_i}{\mu_{i-1}} + (1-\beta)S_{i-N}, (1+\rho)S_{i-N}\right), (1-\rho)S_{i-N}\right)$$

$$Var_i = \max\left(\min\left(\gamma S_{i-N}\left(\frac{X_i}{S_{i-N}} - \mu_i\right)^2 + (1-\gamma)Var_{i-1}, (1+\psi)^2 Var_{i-1}\right), MinSD^2\right)$$

wherein step d) comprises evaluating the formulas:

$$D_i = \frac{X_i - S_{i-N}\mu_{i-1}}{\sqrt{S_{i-N}Var_{i-1}}}$$

$$Z_i = [Z_{i-1} + f(D_i) - \delta]^+$$

where δ represents a grown stabilization parameter; and wherein step d) further comprises triggering the anomaly alarm when $Z_i>T$ and $D_i>T$ wherein Di represents a measure of the deviation of Xi from the estimated baseline and Zi represents a cumulative sum of deviations.

2. The network server of claim 1, wherein step a) comprises using a ramp-up value to generate the baseline value.

3. The network server of claim 1, wherein step a) comprises using exponential smoothing to generate the baseline value.

4. The network server of claim 1, wherein step c) comprises using exponential smoothing to adjust the baseline value.

5. The network server of claim 1, wherein the non-anomalous data and current data represent numbers of packets sent over a network.

6. The network server of claim 1, wherein the non-anomalous data and current data represent amounts of bytes sent over a network.

* * * * *

UNITED STATES PATENT AND TRADEMARK OFFICE
CERTIFICATE OF CORRECTION

PATENT NO. : 7,808,916 B1
APPLICATION NO. : 11/275356
DATED : October 5, 2010
INVENTOR(S) : Kenichi Futamura and Danielle Liu Page 1 of 1

It is certified that error appears in the above-identified patent and that said Letters Patent is hereby corrected as shown below:

In the Claims

In Claim 1, in Column 10, line 36, and ending with Column 10, line 39 should read:

$$Var_1 = \max\left(\min\left(\gamma\theta S_{i-N}\left(\frac{X_i}{S_{i-N}} - \mu_{i-1}\right)^2 + (1-\gamma\theta)Var_{i-1}, (1+\psi\theta)^2 Var_{i-1}\right), MinSD^2\right)$$

In Claim 1, in Column 10, line 55, and ending with Column 10, line 55 should read:

$$Var_1 = \max\left(\min\left(\gamma S_{i-N}\left(\frac{X_i}{S_{i-N}} - \mu_{i-1}\right)^2 + (1-\gamma)Var_{i-1}, (1+\psi)^2 Var_{i-1}\right), MinSD^2\right)$$

Signed and Sealed this
Seventeenth Day of May, 2011

David J. Kappos
*Director of the United States Patent and Trademark Office*